United States Patent Office 3,567,419
Patented Mar. 2, 1971

3,567,419
PLANT GROWTH REGULANT MATERIAL
Ronald Alfred Dean, Laleham, John Sidney Ashford, Hampton Hill, and Patrick Gould, Woodham, near Weybridge, England, assignors to The British Petroleum Company Limited, London, England
No Drawing. Continuation of application Ser. No. 509,439, Nov. 23, 1969. This application Apr. 22, 1969, Ser. No. 818,455
Claims priority, application Great Britain, Nov. 24, 1964, 47,722/64, 47,723/64
Int. Cl. C05f 11/00
U.S. Cl. 71—11    4 Claims

ABSTRACT OF THE DISCLOSURE

A method of treating soil to improve its ability to promote and support plant life is provided which comprises adding to the soil a solid, water-insoluble plant growth regulant consisting essentially of an aromatic-containing petroleum fraction, modified to contain, in chemically bound form, at least one component selected from the group consisting of the essential plant nutritive elements and ionic groups. These modified materials are solid and water-insoluble and depending on the nature of their chemical modification, act either as slow release fertilisers or soil-ion retention media or both.

CROSS-REFERENCE TO RELATED APPLICATIONS

This application is a continuation of U.S. application Ser. No. 509,439, filed Nov. 23, 1969.

This invention relates to plant growth regulant materials.

Many conventional fertilizers, for example ammonium nitrate and ammonium sulphate, suffer from the disadvantage that they are soluble in water and so tend to be leached out of the soil without the nutritive elements contained in the fertilizer being utilised by the plants. For example, in the case of ammonium sulphate as much as 70% of the ammonium ions added to the soil may be leached from the environment of the plant roots and are thus unavailable to the plants. This disadvantage of conventional nitrogen fertilisers, is particularly noticeable in countries which are liable to experience violent tropical rainstorms, for example Costa Rica. The fact that conventional fertilisers are easily leached from the soil means that large quantities of the fertilisers have to be added to the soil to enable sufficient nitrogen to be absorbed by the plants. This latter procedure brings with it the added disadvantage that the high concentrations of fertiliser present at any one time may have a detrimental effect on the plants, as was shown by E. J. Russell in "Soil Conditions and Plant Growth" (1950) (8th edition) published by Longmans, Green and Company (London), page 31. Furthermore, it is not economic to subject the soil to frequent applications of small amounts of fertiliser.

Apart from the common inorganic fertilisers, various proposals have been made to utilise organic materials derived from various petroleum fractions as plant growth promoting agents. For example it has been proposed to use water-soluble, oil-insoluble petroleum green acids or their ammonium salts to promote the growth of plants. However, although the ammonium salts constitute a source of nitrogen, they suffer from the same disadvantages as the water-soluble inorganic fertilizers and are relatively easily leached from the soil. It has also been proposed to apply fuel oils boiling in the range 450–700° F. to soils to enhance plant growth, control nematodes and fungi and to control weed growth. Such material does not however constitute a source of the essential plant nutritive elements.

We have now found that solid water-insoluble materials derived from certain petroleum fractions which have been modified to contain, in chemically bound form, at least one essential plant nutritive element and/or at least one ionic group are capable of functioning as plant growth regulant materials.

The plant growth regulant materials according to the present invention may function as slow release fertilisers and/or soil ion retention materials. Those materials containing chemically bound essential plant nutritive elements will function as slow release fertilizers whilst those containing chemically bound ionic groups will function as soil ion retention materials. It has been found that these latter materials when added to soil will retain essential fertilizer ions such as ammonium ions in the top layers of the soil so that such nutrients for plants grown in the soil. The source of the essential fertilizer ions to be retained may conveniently be conventional inorganic fertilizers. It will be understood that some of the materials according to the invention may act in a dual capacity, i.e., they can act as slow release fertilizers and also as soil ion retention materials.

Accordingly the present invention provides a solid, water-insoluble plant growth regulant material comprising an aromatic-containing petroleum fraction, modified to contain, in chemically bound form, at least one essential plant nutritive element and/or at least one ionic group.

Preferably the aromatic-containing petroleum fraction is an aromatic extract of a petroleum fraction boiling within the kerosine, gas-oil or lubricating oil range.

Particularly suitable aromatic extracts are those derived by solvent extraction, of petroleum fractions boiling in the kerosine, gas-oil or lubricating oil range, e.g., by sulphur dioxide extraction, furfural extraction, acid extraction or any other conventional solvent used to extract aromatic materials from said fractions.

Other fractions which may be employed are aromatic-containing atmospheric and vacuum residues, and decanted oil by which is meant the residue obtained from the atmospheric distillation of the products of reacting vacuum distillates in a fluid-bed catalytic cracker.

The aromatic-containing fractions used should contain more than 30% by weight and preferably more than 50% by weight of aromatics.

The essential plant nutritive elements which are particularly suitable for incorporation into aromatic-containing petroleum fractions are sulphur, nitrogen, phosphorus and potassium. The aromatic-containing petroleum fractions may be modified to contain all or some of these essential elements.

If the plant growth regulant material of the invention is to function as a slow-release fertilizer, it is particularly advantageous for the working of the invention if the nitrogen in the modified petroleum fraction is in the form of the following groups: amino, nitro, or mixtures of these groups. The nitrogen content of the fertiliser preparation should be greater than 0.2% by weight and preferably greater than 2% by weight. It is also particularly advantageous for the working of this aspect of the invention if the phosphorus is in the form of a phosphate or phosphite ester or a salt of a phosphate or phosphite ester, or any combination of these. The phosphorus content of the fertiliser combination should be greater than 0.2% by weight and preferably greater than 2% by weight. It is also particularly advantageous for the working of this aspect of the invention if the potassium is in the form of a salt of a sulphonic, carboxylic, phosphoric or phosphorus acid or as a salt of a phenol or any combination of these salts. The potassium content of the fertiliser composition should be greater than 0.2% by weight and preferably greater than 2% by weight.

A convenient method for the preparation of plant growth regulants to function as slow release fertilizers is to first sulphonate the aromatic extract by reaction with sulphuric acid and then react the sulphonated material with a reagent containing the desired plant nutritive elements.

Having regard to those materials of the invention which function as soil ion retention materials, both anionic and cationic groups may be introduced into the petroleum fractions. Anionic groups which are particularly suitable for incorporation into aromatic-containing fractions are sulphonic acid groups, phosphoric acid groups, phenolic groups and carboxylic acid groups, for example carboxymethyl groups. A cationic group which is particularly suitable for incorporation into aromatic-containing petroleum fractions is the quaternary ammonium group. Any combination of the above groups may be selected for incorporation into the same petroleum fraction.

The anionic groups are normally introduced into the petroleum fraction by causing the petroleum fraction to react with the appropriate acid. For example sulphonic acid groups are introduced by causing the petroleum fraction to react with sulphuric acid. It is therefore usually necessary to remove the acid remaining in the product after the reaction before applying it to the soil since the presence of strong and corrosive acids such as sulphuric acid in the soil would obviously inhibit growth.

Therefore a convenient method of preparing the soil ion retention materials comprises reacting a petroleum fraction or a fraction derived from a petroleum fraction with an acid which contains at least one group which is capable of reacting with said petroleum fraction so that there is produced a modified petroleum fraction containing at least one acidic group and then reducing the proportion of said acid in said modified petroleum fraction. Suitable acids for use in accordance with the invention are sulphuric acid, phosphoric acid, chlorophenol, chloroformic acid and chloro-acetic acid.

The proportion of acid in the modified petroleum fraction is preferably reduced by washing said fraction with a nonacidic aqueous medium. A suitable medium is water; another suitable medium is an aqueous alkaline solution. A suitable alkaline solution is an aqueous solution of ammonia or of potassium hydroxide. The use of washing with aqueous ammonia has the advantage that extra nitrogen is added to the plant growth regulant material; this nitrogen will tend to be released quickly when added to the soil. Similarly, washing with aqueous potassium hydroxide will cause potassium ions to be retained in the product which will thereby be improved.

The plant growth regulant materials containing anionic groups may be applied to the soil in the form of a metal salt. The metal is preferably a metal essential or desirable for plant growth so that there is provided a preparation containing metals which are slowly released in the soil thus providing these metals which are essential or desirable for plant growth, and at the same time making available ionic groups which can then retain other essential ions in accordance with this aspect of the invention. Suitable metals are iron, magnesium, copper and zinc.

The plant growth regulant materials containing anionic groups are optionally applied to the soil in the form of their ammonium salts.

According to another aspect of the present invention there is provided a method of treating soil to improve its ability to promote and support plant growth in which the plant growth regulant material hereinbefore described is added to the soil.

The invention is illustrated but not limited by the following examples.

EXAMPLE 1

This example illustrates the preparation of some typical plant growth regulant materials.

(A) Sulphonation of lubricating oil extract

Lubricating oil extract (obtained by extracting a lubricating oil, boiling in the range 439–600° C., with furfural) (20 grams) was dissolved in n-heptane (20 mls.). Concentrated sulphuric acid (5 mls.) was slowly added and then the mixture was stirred and refluxed for 2 hrs. using a Dean and Stark apparatus; 1.5 mls. of water were collected. A black solid, which separated out during the reaction, was collected and then crushed, washed with water until the washings showed a negative acid reaction and dried to give a black powder (10.5 grams).

(B) Incorporation of potassium into lubricating oil extract

Sulphonated lubricating oil extract (1 gram) was heated with stirring with potassium hydroxide (5 grams) at 300–310° C. for 1 hour. The mixture was cooled and then heated with water (10 mls.) until the potassium hydroxide remaining had dissolved. After filtration the residue was washed with water until the washings showed a negative alkaline reaction and then dried in vacuo to give a black powder (0.81 gram) containing 3.8% of potassium by weight.

(C) Incorporation of phosphorus into lubricating oil extract

The potassium-containing preparation from above (0.5 gram) was stirred with 3 N hydrochloric acid (4 mls.); the mixture was filtered and washed until the washings showed a negative acid reaction and then dried in vacuo. The resulting material was treated with phosphorus trichloride (3 mls.) and the resulting mixture was then heated under reflux conditions for ½ hr. The excess phosphorus trichloride was removed under vacuum and the residue heated with water (50 mls.) for 1 hr. on a steam bath. After cooling and filtering, the residue was washed with water until the washings showed a neutral reaction and was then dried in vacuo to give a black powder (0.28 gram) containing 3.4% of phosphorus by weight.

(D) Incorporation of nitrogen into lubricating oil extract (i) Containing nitro-groups.—The potassium-containing preparation from above (1 gram) was allowed to stand at room temperature for 3 hrs. with concentrated nitric acid (10 mls.) After dilution with water, filtration, washing with water until the washings showed a neutral reaction and drying, a brown solid (1.2 grams) containing 4.6% of nitrogen by weight was obtained.

(ii) Containing amino-groups.—The brown solid from the previous experiment (0.5 gram) was heated for 2 hrs. with granular zinc (0.5 gram) and concentrated hydrochloric acid (10 mls.) on a steam bath. Further zinc was added until the orange coloration had been discharged. The mixture was diluted with water, filtered and washed with water before stirring with 3 N sodium hydroxide (20 mls.). The resulting mixture was filtered, washed with water until the washings showed a neutral reaction and dried in vacuo to give a black solid (0.47 gram) containing 4.6% of nitrogen by weight.

The materials containing nitrogen were then tested for their nitrogen-releasing properties under aerobic soil conditions. The fertilisers were compared to a commercial fertiliser containing 7% of nitrogen by weight, mostly in the form of ammonium sulphate, by incubating the materials at 30° C. with soils moistened with 15% of water by weight and then determining the amount of nitrate present and how this amount varied with time. The determination was achieved by extracting the soil (10 grams) with Morgan's solution (50 ml.) (100 grams of sodium acetate and 30 mls. of acetic acide made up to 1 litre with water) and then proceeding according to the method described by Bear in "Chemistry of Soil," 2nd edition (1964) p. 496, published by the Reinhold Publishing Corp. The results of these experiments are shown in the table.

TABLE
[Nitrate content, in p.p.m.]

|  | Soil | Soil plus commercial fertiliser | Soil plus— | |
|---|---|---|---|---|
|  |  |  | Nitropreparation | Aminopreparation |
| Weeks: |  |  |  |  |
| 0 | 7.4 | 6.2 | 6.9 | 6.7 |
| 1 | 10.9 | 8.9 | 9.4 | 8.5 |
| 2 | 12.1 | 9.2 | 11.7 | 10.0 |
| 3 | 9.1 | 8.4 | 11.3 | 9.1 |
| 4 | 9.3 | 9.4 | 22.5 | 13.8 |
| 5 | 9.5 | 9.0 | 18.4 | 11.9 |
| 6 | 11.6 | 9.0 | 17.3 | 10.8 |
| 7 | 9.6 | 9.1 | 20.1 | 13.9 |
| 8 | 14.5 | 13.9 | 21.0 | 13.8 |
| 9 | 11.1 | 10.4 | 20.9 | 14.4 |
| 10 | 10.3 | 9.6 | 18.6 | 11.9 |

The table illustrates that more nitrogen is made available in the form of nitrate over a prolonged period from the compositions of the present invention than from the commercial fertilizer tested for purposes of comparison.

EXAMPLE 2

Lubricating oil extract (obtained by extracting a lubricating oil, boiling in the range 439–600° C., with furfural; approximate molecular weight range: 200–1000) (2 kgms.) was dissolved in n-heptane (1 litre). Concentrated sulphuric acid (500 mls.) was slowly added while the mixture was stirred under reflux conditions. The mixture was stirred and heated under reflux conditions for 6½ hours in a Dean and Stark apparatus; 113 mls. of water were collected. A black solid, which separated out during the reaction, was collected and crushed, washed with n-heptane, washed with water until the washings showed a negative acid reaction and then dried to give a black powder (956 grams). The material so obtained contained approximately 1 sulphonic acid group on average per molecule.

The product was examined for its ion-retaining properties on a partially dried soil (containing 15% of water by weight) which had been sieved through a 12-mesh sieve. Two columns (18 inches x 1 inch diameter) of soil were prepared; one of these columns of soil contained 50% wt. of the material prepared above while the other contained soil alone. Both columns were washed with water (600 mls.). An aqueous solution of ammonium sulphate (5% by weight) (250 mls.) was added to each column and then each column was washed with water; the ammonia content of the eluate was monitored. The results are shown in the accompanying table.

TABLE
[Concentration of $(NH_4)_2SO_4$ in eluate]

| Volume of eluate | Soil alone | Soil plus ion exchange material |
|---|---|---|
| Milliliters: |  |  |
| 42 | 3.6 |  |
| 50 |  | 0 |
| 70 |  | 0.2 |
| 125 |  | 2.0 |

EXAMPLE 3

This example illustrates the preparation of further typical plant growth regulant materials.

(A) Nitration of lubricating oil extract (I)

Lubricating oil extract (obtained by extracting a lubricating oil, boiling in the range 439–600° C., with furfural) (1 gram) was heated at 100° C. with fuming nitric acid (10 ml.) for 2 hours. The mixture was cooled and diluted with water (30 ml.) whereupon an orange sticky solid formed which solidified on standing. The solid was removed, ground into a powder in the presence of water (5 ml.), filtered, and washed with water until the washings showed a neutral reaction. The product was dried in vacuo to give an orange solid (0.8 gram) containing 5.3 percent of nitrogen by weight.

(B) Reduction of nitrated lubricating oil extract (I)

The orange solid from the previous experiment (0.5 gram) was heated for 2 hours with granulated zinc (0.5 gram) and concentrated hydrochloric acid (10 ml.) in a steam bath. Further zinc was added until the orange colouration had been discharged. The mixture was diluted with water (10 ml.) filtered and washed with water before stirring with 3 N sodium hydroxide (20 ml.). The resulting mixture was filtered, washed with water until the washings showed a neutral reaction and dried in vacuo to give a brown solid (0.45 gram) containing 4.3 percent of nitrogen by weight.

(C) Nitration of lubricating oil extract (II)

Fuming nitric acid (30 ml.) and concentrated sulphuric acid (45 ml.) were stirred while lubricating oil extract (obtained by extracting a lubricating oil, boiling in the range 439–600° C., with furfural) (30 grams) was added dropwise at a temperature sufficient to maintain the extract in a mobile state. The vigorous reaction which resulted was controlled by the use of an ice cooling bath and adjustment of the addition rate of the extracts. The reaction mixture was cooled, poured on to water (200 ml.) and filtered. The orange solid obtained was ground to a powder in the presence of water, filtered and washed with water until the washings showed a neutral reaction. The residue was dried in vacuo to give an orange solid (22.4 grams) containing 6.2 percent of nitrogen by weight.

(D) Nitration of decanted oil

Fuming nitric acid (25 ml.) was stirred with concentrated sulphuric acid (34 ml.) while 30 g. of decanted oil (the residue obtained from the atmospheric distillation of the products obtained by the reaction of vacuum distillates in a fluid-bed catalytic cracker) was added dropwise at a temperature to maintain the decanted oil in a fluid state. The vigorous reaction which resulted was controlled by use of an ice cooling bath and by adjustment of the addition rate of the decanted oil. The reaction mixture was cooled, poured into water (200 ml.) and filtered. The brown solid obtained was ground to a powder in the presence of water, filtered and washed with water until the washings showed a neutral reaction. The residue was then dried in vacuo to give a brown solid (25.3 grams) containing 5.3 percent of nitrogen by weight.

EXAMPLE 4

This example illustrates the use of a sulphonated lubricating oil extract prepared according to Example 2 in various plant trials.

Tomato and maize plants were grown in a series of trials containing three groups of plants as shown below. By consideration of plant height and dry weight at the end of 5 weeks, growth and leaf analysis for nitrogen, it may be seen that the use of sulphonated lubricating oil when added to soil containing a commercial fertilizer gives an improvement compared with soil alone or soil containing the fertilizer.

|  | Maize watered with 25 ml. distilled water daily | | | Maize 10 ml. distilled water daily | | | Tomato 25 ml. distilled water daily | | | Tomato 10 ml. distilled water daily | | |
|---|---|---|---|---|---|---|---|---|---|---|---|---|
|  | Plant height, cm. | Dry plant weight, grams | Nitrogen, percent weight | Plant height, cm. | Dry plant weight, grams | Nitrogen, percent weight | Plant height, cm. | Dry plant weight, grams | Nitrogen, percent weight | Plant height, cm. | Dry plant weight, grams | Nitrogen, percent weight |
| Soil alone | 42.5 | 0.623 | 1.3 | 16.5 | 0.065 | 2.3 | 14.5 | 0.146 | 3.2 | 6.0 | 0.014 | 2.8 |
| Soil plus growmore | 52.0 | 1.655 | 2.0 | 21.0 | 0.091 | 1.2 | 22.0 | 0.532 | 4.6 | 7.0 | 0.014 | 2.8 |
| Soil plus growmore plus sulphonic acid | 62.0 | 1.575 | 4.1 | 37.0 | 0.692 | 4.4 | 38.5 | 1.904 | 3.9 | 22.0 | 0.344 | 4.1 |

In these trials, to soil (1 kg.) was added commercial fertilizer (3 g.) and sulphonated lubricating oil extract (18.4 g.) as above.

The analysis of the commercial fertilizer is given as: nitrogen 7 percent, soluble phosphoric acid 5 percent, insoluble phosphoric acid 2 percent, potash 7 percent.

Further experiments have been carried out in which the average height and wet weight of tomato plants after 38 days growth in the presence of sulphonated lubricating oil extract have been measured.

|  | Average height, cm. | Average wet weight, grams |
|---|---|---|
| Soil alone | 41 | 48.1 |
| Soil plus growmore | 42.3 | 47.8 |
| Soil plus growmore plus sulphonic acid | 45.4 | 52.7 |

The quantities of soil, fertilizer and sulphonated lubricating oil extract used in these trials are the same as those in the previous trials.

We claim:

1. A method of treating soil to improve its ability to promote and support plant growth which comprises adding to the soil a solid, water-insoluble plant growth regulant consisting essentially of an aromatic-containing petroleum fraction which contains at least 30 percent by weight of aromatics selected from the group consisting of an aromatic extract of a petroleum fraction boiling in the kerosine, gas-oil or lubricating oil range, an aromatic-containing residue from the atmospheric or vacuum distillation of crude petroleum, and an aromatic-containing residue from the atmospheric distillation of the products of reacting vacuum distillates in a fluid-bed catalytic cracker, said aromatic-containing petroleum fraction being chemically modified to contain chemically bound nitrogen in the form of a member selected from the group consisting of amino and nitro from which they are capable of being released in the soil environment.

2. A method according to claim 1 wherein the nitrogen content of the modified aromatic-containing fraction is greater than 0.2% by weight and preferably greater than 2% by weight.

3. A method according to claim 1 wherein said chemically bound nitrogen is in the form of an amino group.

4. A method according to claim 1 wherein said chemically bound nitrogen is in the form of a nitro group.

References Cited

UNITED STATES PATENTS

| 2,471,213 | 5/1949 | Higgins | 71—1X |
| 3,082,074 | 3/1963 | Handley et al. | 71—1 |
| 2,754,189 | 7/1956 | Hetzel | 71—25X |
| 2,829,040 | 4/1958 | Danin et al. | 71—25 |
| 2,995,433 | 9/1961 | Gonen et al. | 71—25X |

REUBEN FRIEDMAN, Primary Examiner

R. BARNES, Assistant Examiner

U.S. Cl. X.R.

71—25